United States Patent
Lee et al.

(10) Patent No.: US 11,334,398 B2
(45) Date of Patent: May 17, 2022

(54) LEARNING-BASED THERMAL ESTIMATION IN MULTICORE ARCHITECTURE

(71) Applicant: International Business Machines Corporation, Armonk, NY (US)

(72) Inventors: Eun Kyung Lee, Bedford Corners, NY (US); Bilge Acun, White Plains, NY (US); Yoonho Park, Chappaqua, NY (US); Paul W. Coteus, Yorktown, NY (US)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 16/116,289

(22) Filed: Aug. 29, 2018

(65) Prior Publication Data
US 2020/0073726 A1   Mar. 5, 2020

(51) Int. Cl.
G06F 9/455   (2018.01)
G06F 9/50    (2006.01)
G06N 3/04    (2006.01)

(52) U.S. Cl.
CPC ............ G06F 9/5094 (2013.01); G06F 9/505 (2013.01); G06F 9/5044 (2013.01); G06F 9/5066 (2013.01); G06N 3/04 (2013.01)

(58) Field of Classification Search
CPC ...... G06F 9/5094; G06F 9/5044; G06F 9/505; G06F 9/5066; G06N 3/04
See application file for complete search history.

(56) References Cited

U.S. PATENT DOCUMENTS

| | | | |
|---|---|---|---|
| 2005/0022185 A1* | 1/2005 | Romero | G06F 11/3409 718/100 |
| 2010/0315223 A1* | 12/2010 | Gross | G05B 13/048 700/304 |
| 2012/0233477 A1* | 9/2012 | Wu | G06F 9/5094 713/320 |
| 2014/0189710 A1 | 7/2014 | Sur et al. | |
| 2016/0378519 A1* | 12/2016 | Gaurav | G06F 9/505 718/1 |
| 2017/0083383 A1* | 3/2017 | Rider | G06F 9/5094 |
| 2017/0261380 A1 | 9/2017 | Cher et al. | |

(Continued)

OTHER PUBLICATIONS

Acun et al. (Neural Network-Based Task Scheduling with Preemptive Fan Control, 2016 4th International Workshop on Energy Efficient Supercomputing, 2016).*

(Continued)

Primary Examiner — Hang Pan
(74) Attorney, Agent, or Firm — Scully, Scott, Murphy & Presser, P.C.; Daniel P. Morris

(57) ABSTRACT

An application to run on a hardware processor comprising a plurality of cores may be received. Hardware resource utilization data associated with the application may be obtained. A trained neural network with the hardware resource utilization data associated with the application is run, the trained neural network predicting core temperature associated with running the application on a core of the hardware processor. Based on the core temperature predicted by the trained neural network, the plurality of cores may be controlled to run selective tasks associated with the application.

19 Claims, 5 Drawing Sheets

(56) References Cited

U.S. PATENT DOCUMENTS

2017/0277564 A1     9/2017   Coteus et al.
2019/0370066 A1*   12/2019   Ma ........................ G06F 9/4893

OTHER PUBLICATIONS

Das, A., et al., "Reinforcement Learning-Based Inter- and Intra-Application Thermal Optimization for Lifetime Improvement of Multicore Systems", DAC' 14, Jun. 1-5, 2014, 6 pages.

Zhang, K., et al., "Minimizing Thermal Variation Across System Components", 2015 IEEE 29th International Parallel and Distributed Processing Symposium, May 25-29, 2015, pp. 1139-1148.

Moore, J., et al., "Weatherman: Automated, Online, and Predictive Thermal Mapping and Management for Data Centers", 2006 IEEE International Conference on Autonomic Computing, Jun. 12-16, 2006, pp. 155-164.

Narayana, S.A., "An Artificial Neural Networks based Temperature Prediction Framework for Network-on-Chip based Multicore Platform", A Thesis Submitted in Partial Fulfillment of the Requirements for the Degree of Master of Science in Electrical Engineering, Rochester Institute of Technology, Mar. 2016, 56 pages.

Ramachandran, H., et al., "Whitepaper: Data Center Manageability Interface (DCMI) Specification", https://www.intel.com/content/dam/www/public/us/en/documents/white-papers/data-center-manageability-interface-paper.pdf, Aug. 2008, Accessed on Aug. 29, 2018, 11 pages.

\* cited by examiner

LEARNING-BASED THERMAL ESTIMATION IN MULTICORE ARCHITECTURE

BACKGROUND

The present disclosure relates generally to computers and computer applications, and more particularly to thermal estimation of computing devices and allocation of hardware cores to tasks based on the thermal estimation.

Understanding thermal properties of a computing device can lead to better maintenance of a computer system. For instance, based on a computing device's thermal information, the computing device's cooling aspects and the hardware wear and tear associated with the computing device may be controlled and maintained efficiently. Such efficient maintenance also saves the cost of the owners in maintaining the equipment. However, it is not easy to model and estimate thermal data, for example, due to the complexity of thermodynamics involved, manufacturing differences of different components of the computing device and different computing devices, and general heat conduction aspects. Some methods, which provide thermal estimation, either require too many inputs, which can cause high measurement overhead during the application run, or are not fine grained enough to accurately estimate hardware core-to-hardware core temperature variations.

BRIEF SUMMARY

A system and method may be provided, which can automatically learn to predict thermal properties or temperature of a hardware core, and which may also allocate tasks to cores on a multi-core processor based on the predicted temperature.

The system, in one aspect, may include at least one hardware processor and a memory device coupled to the at least one hardware processor. The hardware processor may be operable to at least receive an application to run on a target hardware processor, the target hardware processor comprising a plurality of cores. The hardware processor may be further operable to obtain hardware resource utilization data associated with the application. The hardware processor may be also operable to execute a trained neural network with the hardware resource utilization data associated with the application, the trained neural network predicting core temperature associated with running the application on a core of the target hardware processor. The hardware processor may be further operable to, based on the core temperature predicted by the trained neural network, control the plurality of cores to run selective tasks associated with the application.

A method, in one aspect, may include receiving hardware resource utilization data and corresponding core temperature data associated with running a plurality of applications. The method may also include, based on the hardware resource utilization data and corresponding core temperature data, training a machine to predict a future core temperature given usage data of an input application to run on a hardware processor, the training comprising building a neural network according to configured hyperparameters and allowing the neural network to learn autonomously to predict the future core temperature based on the hardware resource utilization data and corresponding core temperature data.

In another aspect, a method may include receiving an application to run on a hardware processor, the hardware processor comprising a plurality of cores. The method may also include obtaining hardware resource utilization data associated with the application. The method may further include executing a trained neural network with the hardware resource utilization data associated with the application, the trained neural network predicting core temperature associated with running the application on a core of the hardware processor. The method may also include, based on the core temperature predicted by the trained neural network, controlling the plurality of cores to run selective tasks associated with the application.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A learning-based system, method and techniques may be provided, which estimate hardware-specific temperature based on resource utilization rate, for example, utilization rate of resources such as the central processing unit (CPU), graphics processing unit (GPU), memory, fan, cooling liquid flow, and/or other components of a computing and cooling devices. In some embodiments, the learning-based system, method and techniques include a learning-based algorithm (e.g., Neural Network (NN)).

In some embodiments, the learning-based algorithm includes a training phase and a deployment phase. The training phase in some embodiments includes a computing system or application, which collects hardware resource utilization rate data associated with hardware resources such as the hardware core utilization, GPU utilization, memory usage, fan speed, cooling liquid flow, and temperature. In some embodiments, the collected raw data (hardware resource utilization rate date) is pre-processed and fed to a learning algorithm, for example, a neural network. For instance, a neural network architecture may be generated based on configured hyperparameters such as the number input units (nodes), number of hidden layers, number of hidden units (nodes) in each hidden layer of the neural network, the number of output nodes, the type of activation function, and other hyperparameters employed in implementing a neural network. In some embodiments, the hyperparameters and structure (e.g., activation function, the number of hidden layers and nodes) of the NN can vary depending on the type of inputs. As an example, a simple 3-layer (input, hidden, output) may be architected, which predicts core temperature based on the utilization rates of individual cores and fan speeds. The NN architecture can vary, for example, have deeper NN layers, for instance, based on the number of inputs (e.g., other hardware (HW) component inputs), which may impact the core temperature.

In some embodiments, the neural network (NN) is trained by a back propagation technique, which in learning adjusts the parameters (weights) of the nodes (e.g., hidden units) in the neural network. The deployment phase, in some embodiments, includes inputting new data (e.g., resource utilization rate data) to the trained neural network (NN). The trained NN outputs the estimated temperature.

Figure 1:
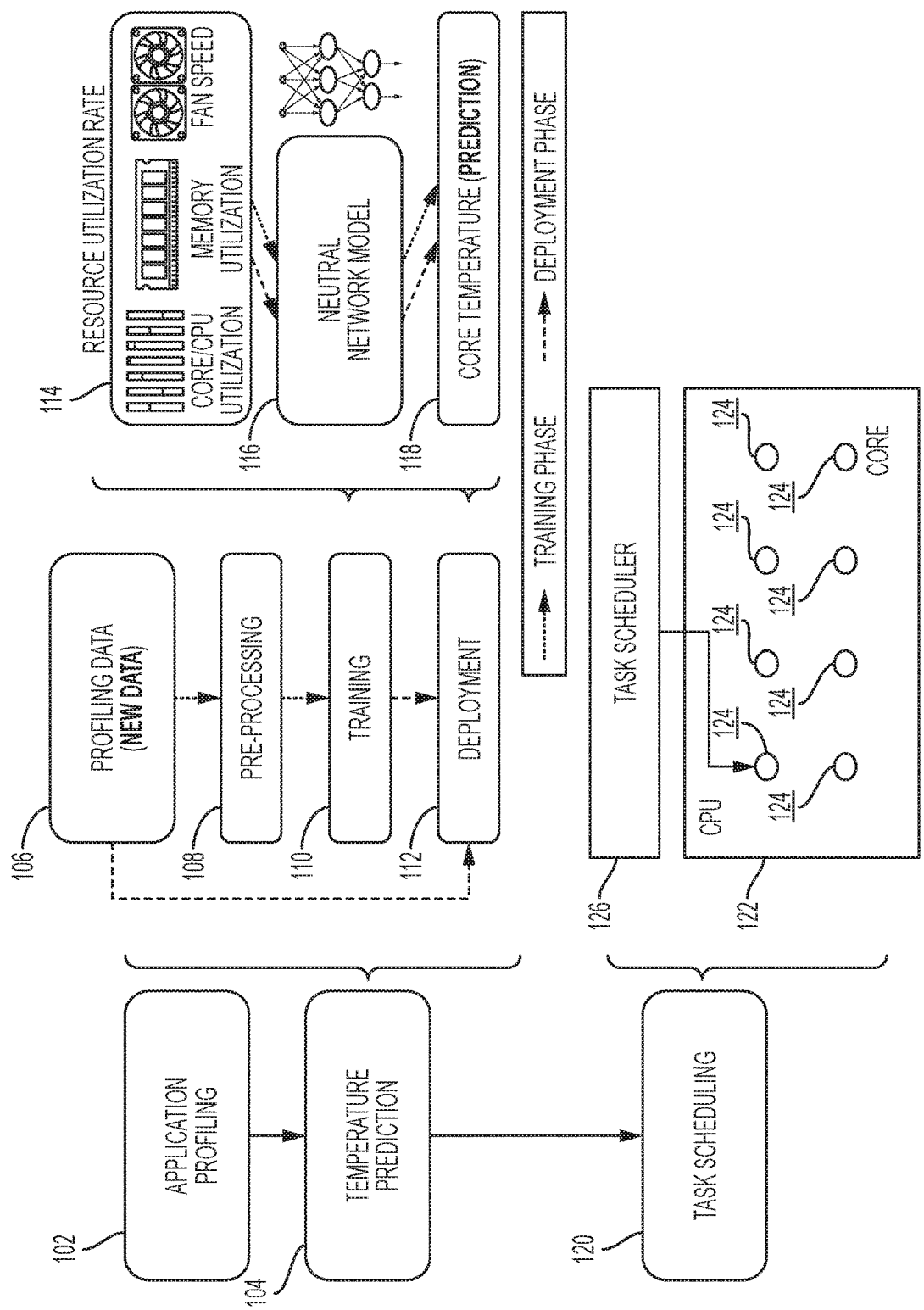
FIG. 1 is a diagram illustrating components of a system in an embodiment.

FIG. 1 is a diagram illustrating components of a system in an embodiment. At least some of the components run or execute on one or more hardware processors. A processor may be a central processing unit (CPU), a graphics processing unit (GPU), a field programmable gate array (FPGA), an application specific integrated circuit (ASIC), another suitable processing component or device, or one or more combinations thereof. Such a processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory, programmed on the processing unit, or received from another computer device or medium.

An application profiling component or module 102, in one embodiment, profiles an application based on the application's hardware usage or utilization rate. A plurality of applications may be profiled. Examples of data associated with an application's hardware utilization rate include data such as, but not limited to, data representing hardware core utilization, GPU utilization, memory usage, fan speed, cooling liquid flow, and temperature. In some embodiment, the application profiling component can monitor core temperatures and collect data through in-band (within operating system) or out-of-band (without the operating system) applications. For example, the computer can measure temperature through in-band and/or out-of-band methods. Annotation technique can be used to mark and separate different application phases for profiling. In some embodiments, profiling can be done in coarse-grained (e.g., average core temperature for application X) or fine-grained (e.g., any statistical methods for different application phases) manner.

A temperature prediction component or module 104, in one embodiment, trains and deploys a neural network (NN) model to predict temperature or a thermal property of one or more hardware cores. Training at 110, in one embodiment, includes using the profiling data 106 (e.g., determined from the application profiling component 102), which may be pre-processed by a pre-processing component 108 to generate pre-processed data 114, to train a neural network model 106 to output a prediction of core temperature 118. Pre-processing at 108 may include taking the raw profiling data 106 (e.g., profiled by the application profiling component 102) and processing it, for example, removing outliers, performing stable data selection for training, normalizing, and/or other pre-processing. The pre-processed data 114, which may be used as a training set, may include labeled data which relates specific core or processor (e.g., CPU or another) utilization, memory utilization, fan speed, cooling liquid flow, and/or other hardware and cooling component utilization data to a specific temperature or a specific range of temperature values.

Deployment at 112 uses new data (e.g., previously unseen by the neural network model 116), which for example, is also pre-processed by the pre-processing component at 108, as input to the trained neural network model, which outputs a prediction, e.g., core temperature 118. For instance, inputting resource utilization rate data associated with an application to the trained neural network produces a temperature prediction.

Task scheduling component 120 (or task scheduler component 126), in one embodiment, assigns and allocates the tasks associated with the application to the physical cores in one or more CPUs 122 using the predicted temperature determined based on the resource utilization rate by, and received from, the temperature prediction component 104. The task scheduling 120, one aspect, balances all the core temperatures by distributing and relocating computer processing tasks, for example, hardware threads and/or software threads associated with one or more applications. By distributing and/or relocating computer processing tasks, in one aspect, the system and method of the present disclosure saves energy needed for cooling the hardware cores or another component of a computer device. Also, in this way a hardware wear and tear on components may be balanced, such that overly excessive wear and tear on one particular component or a set of components is reduced.

Many different thermal aware job placement is possible. For example, a task or job is allocated to the first "coolest" physical core, which has available bandwidth to accommodate the job. Other methods can be employed. In some embodiments, the temperature is predicted by linearly varying the resource utilization rate of the individual core and group of cores, and the varying resource utilization rate is modeled using NN. The modeled or trained NN outputs per-core temperature prediction.

In one aspect, a computer processor 122 may include multiple cores 124. Based on the temperature data, processing tasks may be run on selected number of cores 124. For instance, a task scheduler 126 may balance or schedule different tasks on different cores 124 based on the predicted temperature, for instance, of one or more cores.

Figure 2:
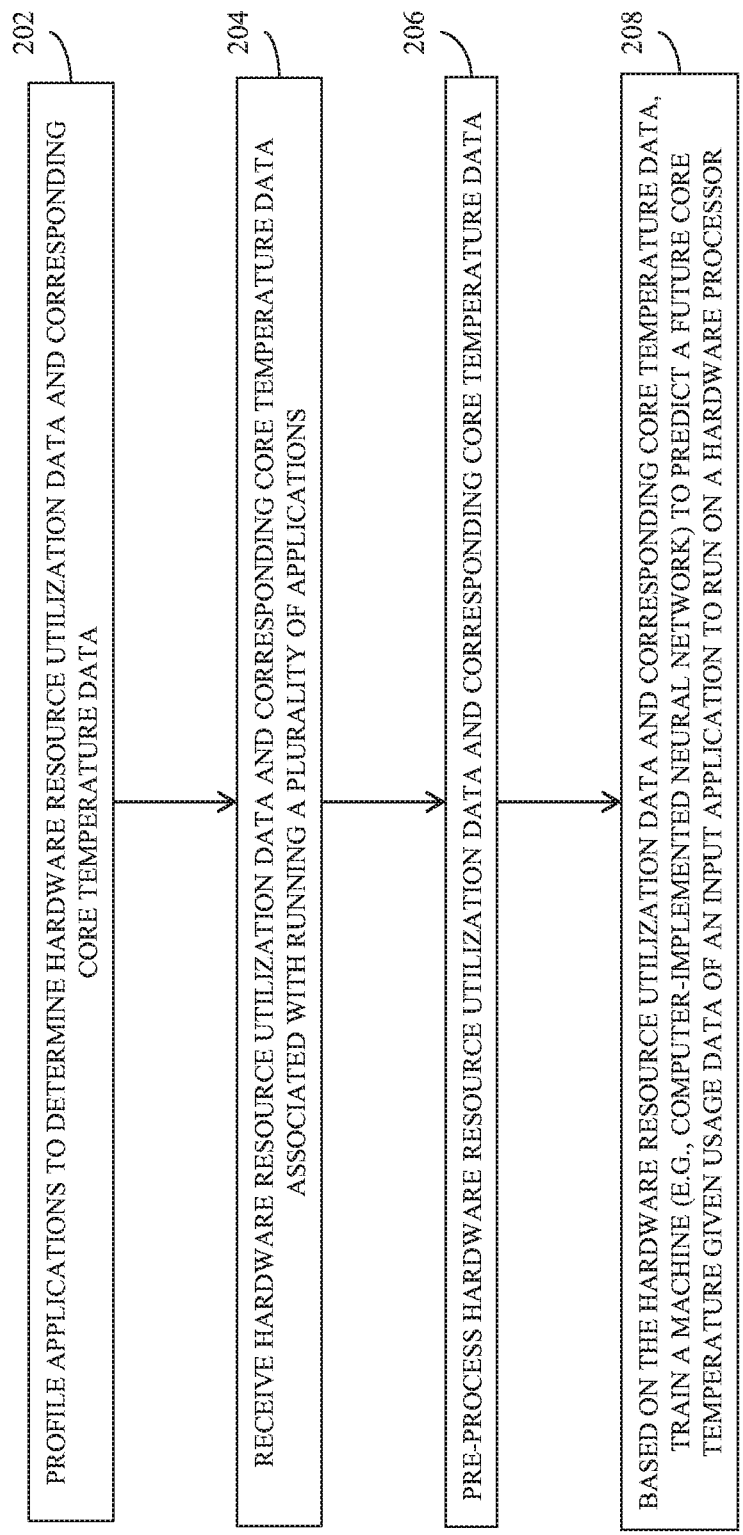
FIG. 2 is a flow diagram illustrating a method according to one embodiment disclosed in the present disclosure.

FIG. 2 is a flow diagram illustrating a method according to one embodiment disclosed in the present disclosure. The method may be performed by a hardware processor. The method illustrated in FIG. 2 in one embodiment shows profiling one or more applications and training a neural network that can predict temperature of a hardware core or another processor. At 202, running applications can be profiled, for example, to determine its hardware resource utilization or utilization rate. For example, while an application is running on a hardware processor, the usage or usage rate of hardware resources (e.g., core utilization, memory utilization, fan speed, cooling liquid flow) by the application and the temperature of the hardware processor can be detected or determined. This data, for example, may be saved or stored, on a storage device, for example, in a database of application profiles. A plurality of different applications can be profiled this way.

At 204, hardware resource utilization data and associated temperature data (e.g., core temperature data, which represents the temperature of a core while an application performed its functions using hardware resources) may be received or retrieved, e.g., from a database of application profiles. At 206, the hardware resource utilization data and associated (or corresponding) temperature data may be pre-processed, for example, in preparation for training a neural network. Examples of pre-processing may include, but are not limited to, removing outliers, performing stable data selection for training, normalizing.

At 208, based on the hardware resource utilization data and associated (or corresponding) temperature data, for example, which may have been pre-processed, machine learning or training is performed. For example, a neural network is trained to predict a temperature of a hardware processor. For instance, the relationship between hardware resource utilization data and temperature of a processor may be modeled by a neural network, for example, by training the neural network based on the application profiling information, for instance, of a plurality of applications which ran on the processor. Training the neural network may include building a neural network architecture or structure, for example, according to configured hyperparameters, and performing a backpropagation technique to adjust the parameters (e.g., weights of the nodes) of the neural network. In one aspect, the training the machine is done in autonomous manner, for instance, as the neural network trains itself by autonomously adjusting the parameters based on learning (e.g. backpropagation technique).

Figure 3:
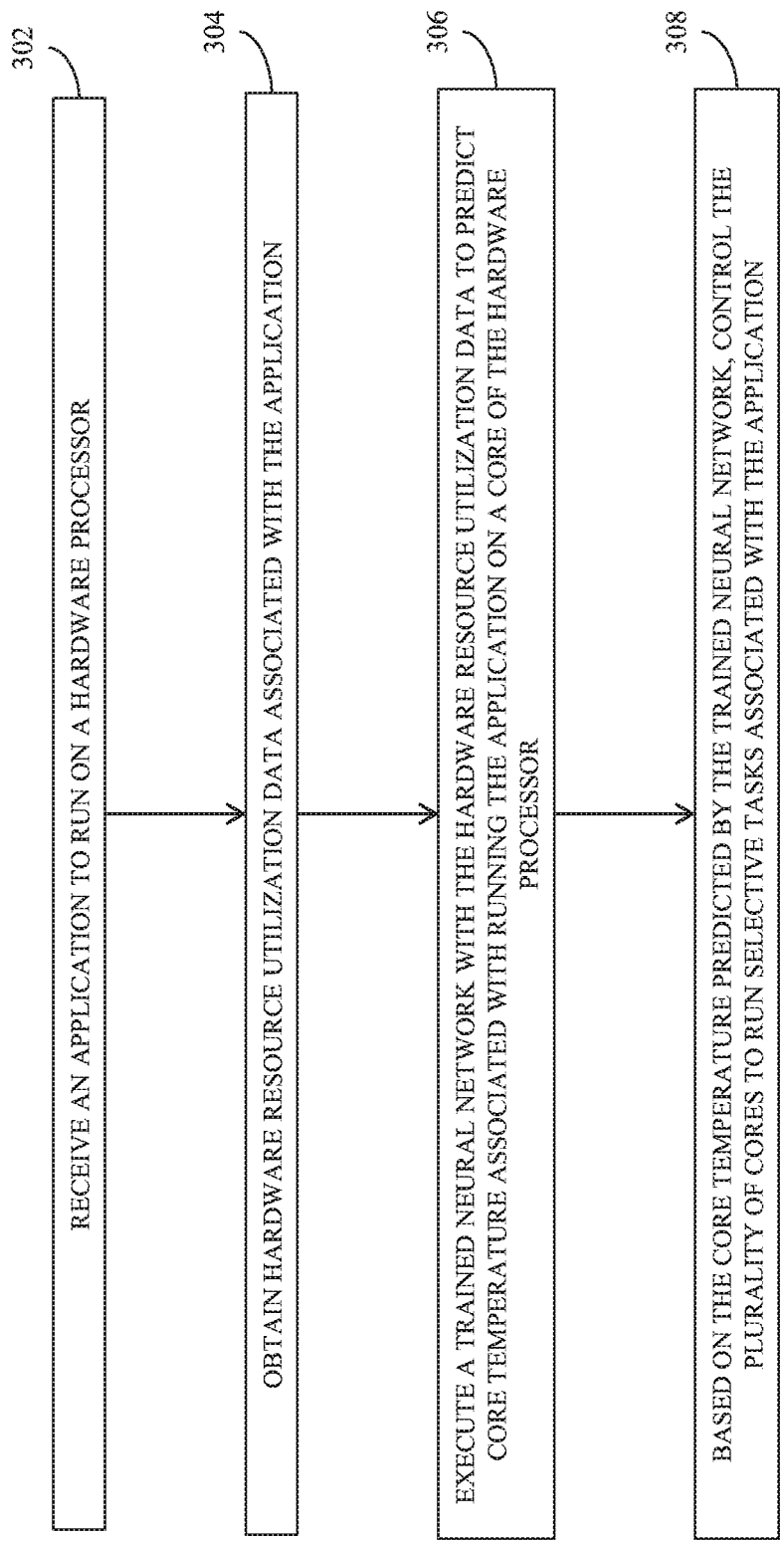
FIG. 3 is a flow diagram illustrating a method of deploying a trained neural network and for example, scheduling tasks on one or more hardware processors in one embodiment.

FIG. 3 is a flow diagram illustrating a method of deploying a trained neural network and for example, scheduling tasks on one or more hardware processors in one embodiment. The method, for example, may be performed by a hardware processor. At 302, one or more applications or tasks to run on a hardware processor may be received. For instance, a task scheduler running on the hardware processor may receive one or more applications to run. At 304, hardware resource utilization data associated with the one or more applications to run are obtained. For instance, a database of application profiles may be accessed to retrieve such information, for instance, if there exists previously profiled data (e.g., historical usage data) associated with the one or more applications. In another aspect, the hardware resource utilization data associated with the one or more applications to run may be obtained by performing an application profiling. For example, application profiling can be done statically or dynamically. The static profiling employs a database that stores or records historical data as discussed above. In one aspect, the dynamic application profiling does need not employ database or historical data. In some embodiments, dynamic application profiling obtains hardware resource utilization data associated with the application by running a code for a short period of time (predetermined amount of time) and uses it for the task allocation. For example, if the first 0.5 seconds of code shows compute-intensive (hot) code, consider the rest of the 9.5 seconds of code region is also compute-intensive. The dynamic profiling can be performed periodically to capture code phase changes.

In one aspect, the obtained data may be already pre-processed data. In another aspect, the obtained data may be pre-processed, for example, in a form to be input to a trained neural network, which is trained to predict temperature of a hardware processor such as a hardware core given input data of hardware resource utilization. At 306, the neural network is run or executed with the hardware resource utilization data associated with the one or more applications as input. The neural network outputs a predicted temperature (e.g., core temperature) associated with the hardware processor. At 308, the running of tasks associated with the one or more applications on the hardware processor are controlled based on the predicted temperature. For instance, hardware cores may be controlled to run specific tasks, for example, selective tasks. For example, based on the predicted temperature, the tasks associated with the one or more applications are distributed or relocated to different cores or hardware processors and run on the respective cores. For instance, allocation of tasks to cores may specify which task to run on which core. Different thermal aware job placement may be contemplated. For example, a task or job is allocated to the first "coolest" physical core, which has available bandwidth to accommodate the job. Other methods may be employed to allocate a task or job to a core based on the temperature of the core or a group of cores.

The distributing or relocating to different cores based on the predicted temperature can minimize overheating of a computer processor. For instance, the method of the present disclosure may avoid scheduling a job on an overheated core, even if it still has power to run the task. In one aspect, a hardware processor that runs the trained neural network need not be the same hardware processor on which the one or more applications is to be run.

Figure 4:
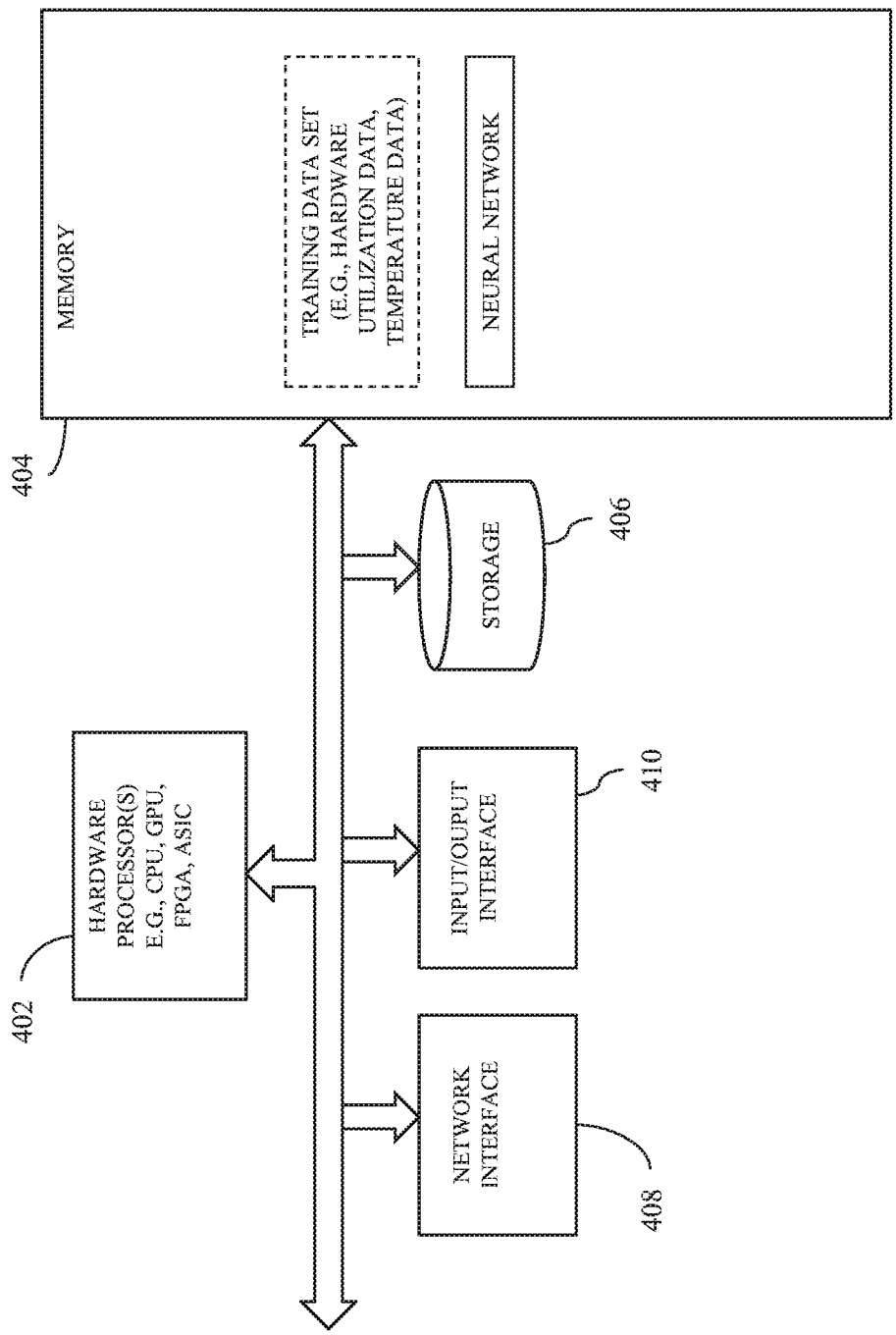
FIG. 4 is a diagram showing components of a system in one embodiment.

FIG. 4 is a diagram showing components of a system in one embodiment. The system, for example, trains and/or deploys a neural network, and also may schedule or distribute tasks on a plurality of cores for balanced execution. One or more hardware processors 402 such as a central processing unit (CPU), a graphic process unit (GPU), a field programmable gate array (FPGA), an application specific integrated circuit (ASIC), and/or another processor, may be coupled with a memory device 404, and predict a core temperature, which prediction may be used to balance the load of a plurality of cores of a target processor (e.g., hardware processor). The memory device 404 may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium. The memory device 404 may, for example, store instructions and/or data for functioning of the one or more hardware processors 402 and may include an operating system and other program of instructions and/or data.

One or more hardware processors 402 may receive an application to run on a target hardware processor, the target hardware processor comprising a plurality of cores. In one embodiment, the target hardware processor need not be one of the one or more hardware processors 402, although it can be one of the processors shown at 402. One or more hardware processors 402 may obtain hardware resource utilization data associated with the application, for example, from a storage device 406, or from a remote device via a network interface 408 and may load the hardware resource utilization data to memory 404, for example, temporarily for use. The hardware resource utilization data associated with the application may include historical usage data associated with the application.

One or more hardware processors 402 may execute a trained neural network with the hardware resource utilization data associated with the application as input. In one aspect, the trained neural network may be loaded to the memory device 404, for instance, from the storage device 406. In another aspect, the trained neural network may be received from a remote device via a network interface 408 and loaded to the memory device 404. The trained neural network predicts core temperature associated with running the application on a core of the target hardware processor. Based on the core temperature predicted by the trained neural network, one or more hardware processors 402 may control the plurality of cores of the target hardware processor to run selective tasks associated with the application. For instance, one or more hardware processors 402 may control the plurality of cores by distributing tasks associated with the application based on the core temperature, across the plurality of cores to run.

One or more hardware processors 402 may be coupled with interface devices such as a network interface 408 for communicating with remote systems, for example, via a network, and an input/output interface 410 for communicating with input and/or output devices such as a keyboard, mouse, display, and/or others.

One or more hardware processors 402 may also train the neural network based on hardware resource utilization data associated with a plurality of applications, to produce the trained neural network. One or more hardware processors 402 may further profile a plurality of application, for instance, as described above, to determine the hardware resource utilization data associated with a plurality of applications.

While FIG. 4 illustrated hardware components of a system which may perform one or more of profiling an application, constructing and training a neural network, running the neural network, and scheduling or distributing tasks on hardware cores (e.g., controlling a hardware core), it should be understood that those functions can be performed separately by different hardware processors or computer systems. For instance, the same hardware processor or computer system need not perform all of those functions. Rather, different hardware processors or computer systems can separately perform one or more of those functions.

Figure 5:
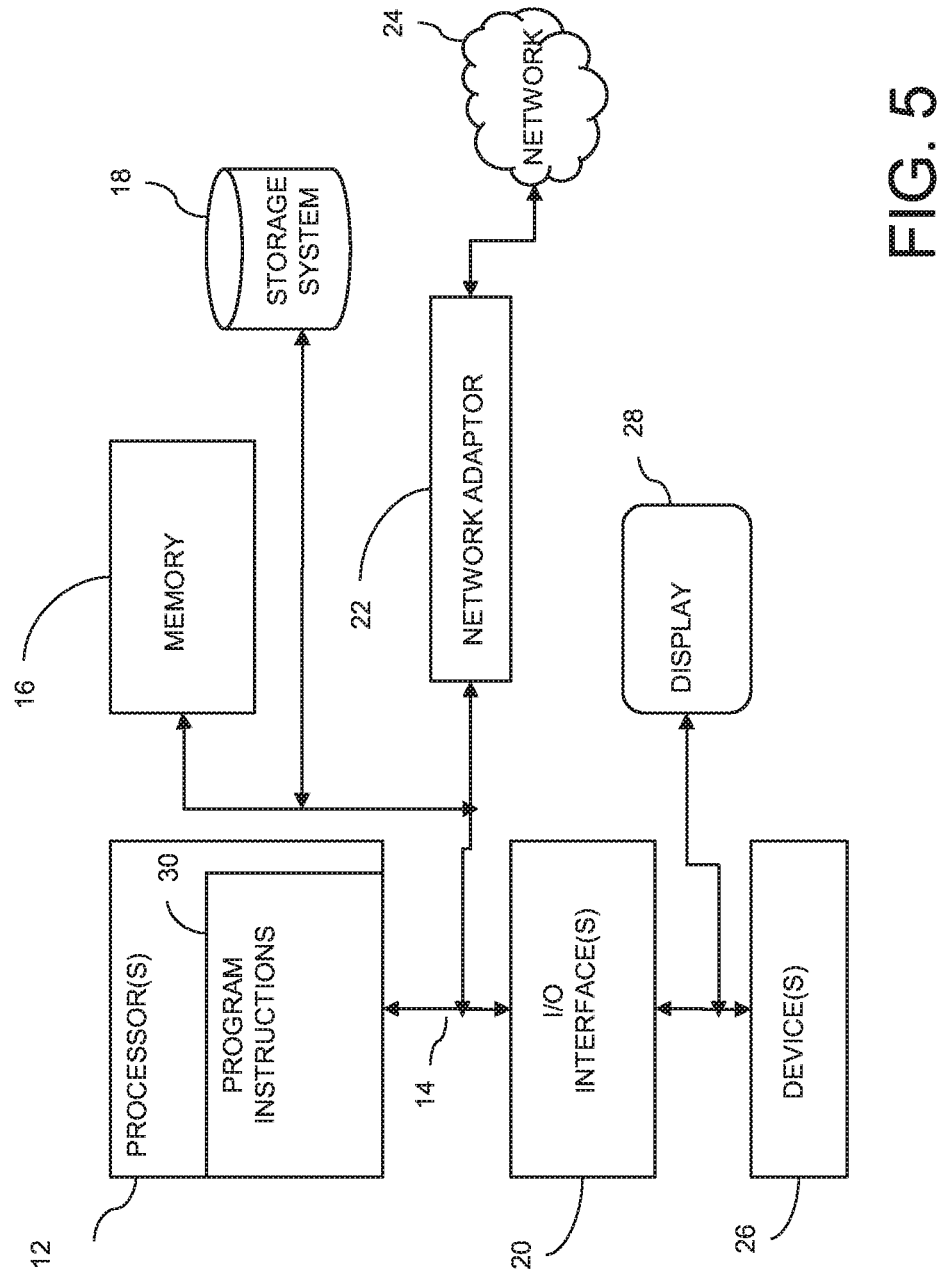
FIG. 5 illustrates a schematic of an example computer or processing system that may implement a system in one embodiment of the present disclosure.

FIG. 5 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general-purpose or special-purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs one or more methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method, comprising:
receiving an application to run on a hardware processor, the application having unknown temperature data, the hardware processor comprising a plurality of cores;
obtaining hardware resource utilization data associated with the application, wherein the hardware resource utilization data is obtained at least by dynamically running a region of the received application for a first percentage of predetermined amount of time and using the obtained hardware resource utilization data as being applicable to rest of the predetermined amount of time, the dynamically running performing periodically to capture code phase changes, the hardware resource utilization data including at least a fan speed associated with running the received application and a cooling liquid flow associated with running the received application, wherein temperature data associated with running the application is to be automatically predicted;
executing a trained neural network with the hardware resource utilization data associated with the application, the trained neural network predicting core temperature associated with running the application on a core of the hardware processor, wherein the trained neural network parameterizes at least fan speed and cooling liquid flow associated with the hardware processor, wherein the neural network is trained to, given an input including previously unseen hardware resource utilization data associated with an individual application, predict the individual application's core temperature associated with running the individual application; and
based on the core temperature predicted by the trained neural network, controlling the plurality of cores to run selective tasks associated with the application.

2. The method of claim 1, wherein the controlling comprises distributing tasks associated with the application across the plurality of cores to run, based on the core temperature.

3. The method of claim 1, wherein the obtaining comprises receiving historical usage data associated with the application.

4. The method of claim 1, further comprising pre-processing the hardware resource utilization data and wherein the trained neural network is executed with the pre-processed hardware resource utilization data.

5. The method of claim 1, wherein a neural network is trained based on hardware resource utilization data associated with a plurality of applications, to produce the trained neural network.

6. The method of claim 5, wherein the plurality of applications is profiled to determine the hardware resource utilization data associated with a plurality of applications.

7. The method of claim 1, wherein the hardware resource utilization data comprises data associated with usage of at least one of a hardware core, a hardware memory, a fan and a liquid flow component.

8. A computer readable storage medium storing a program of instructions executable by a machine to perform a method comprising:
receiving hardware resource utilization data and corresponding core temperature data associated with running a plurality of applications, wherein the hardware resource utilization data is obtained at least by dynamically running a region of the received application for a first percentage of predetermined amount of time and using the obtained hardware resource utilization data as being applicable to rest of the predetermined amount of time, the dynamically running performing periodically to capture code phase changes; and
based on the hardware resource utilization data and corresponding core temperature data, training a machine to predict a future core temperature given usage data of an input application with unknown temperature data to run on a hardware processor, the training comprising building a neural network according to configured hyperparameters and allowing the neural network to learn autonomously to predict the future core temperature based on the hardware resource utilization data and corresponding core temperature data, wherein the neural network parameterizes at least fan speed and cooling liquid flow associated with the hardware processor, wherein the usage data of the input application includes at least the fan speed and the cooling liquid flow associated with running the input application, wherein the neural network is trained to, given an input including previously unseen hardware resource utilization data associated with an individual application, predict the individual application's core temperature associated with running the individual application.

9. The computer readable storage medium of claim 8, further comprising profiling each of the plurality of applications running on at least one hardware processor to determine the hardware resource utilization data and corresponding core temperature data.

10. The computer readable storage medium of claim 9, further comprising storing the hardware resource utilization data and corresponding core temperature data in a database of application profiles.

11. The computer readable storage medium of claim 8, further comprising:
determining hardware resource usage associated with running the input application;
running the neural network with data associated with the hardware resource usage as input, the neural network outputting the future core temperature associated with running the input application.

12. The computer readable storage medium of claim 11, further comprising:
based on the future core temperature output by the neural network, distributing tasks associated with the input application to a plurality of cores associated with the hardware processor, the plurality of cores executing the tasks respectively.

13. A system comprising:
at least one hardware processor;
and a memory device coupled to the at least one hardware processor;
the hardware processor operable to at least:
receive an application to run on a target hardware processor, the application having unknown temperature data, the target hardware processor comprising a plurality of cores;
obtain hardware resource utilization data associated with the application, wherein the hardware resource utilization data is obtained at least by dynamically running a region of the received application for a first percentage of predetermined amount of time and using the obtained hardware resource utilization data as being applicable to rest of the predetermined amount of time, the dynamically running performing periodically to capture code phase changes, the hardware resource utilization data including at least a fan speed associated with running the received application and a cooling liquid flow associated with running the received application, wherein temperature data associated with running the application is to be automatically predicted;

execute a trained neural network with the hardware resource utilization data associated with the application, the trained neural network predicting core temperature associated with running the application on a core of the target hardware processor, wherein the trained neural network parameterizes at least fan speed and cooling liquid flow associated with the hardware processor, wherein the neural network is trained to, given an input including previously unseen hardware resource utilization data associated with an individual application, predict the individual application's core temperature associated with running the individual application; and based on the core temperature predicted by the trained neural network, control the plurality of cores to run selective tasks associated with the application.

14. The system of claim 13, wherein the at least one hardware processor is operable to control the plurality of cores by distributing tasks associated with the application across the plurality of cores to run, based on the core temperature.

15. The system of claim 13, wherein the at least one hardware processor obtains hardware resource utilization data associated with the application by receiving historical usage data associated with the application.

16. The system of claim 13, wherein the at least one hardware processor further pre-processes the hardware resource utilization data and wherein the trained neural network is executed with the pre-processed hardware resource utilization data.

17. The system of claim 13, wherein a neural network is trained based on hardware resource utilization data associated with a plurality of applications, to produce the trained neural network.

18. The system of claim 17, wherein the plurality of applications is profiled to determine the hardware resource utilization data associated with a plurality of applications.

19. The system of claim 13, wherein the hardware resource utilization data comprises data associated with usage of at least one of a hardware core, a hardware memory, a fan and a liquid cooling component.

* * * * *